Sept. 15, 1970        W. A. WARE        3,528,744
INSTRUCTION INTERFEROMETER
Filed May 10, 1967        3 Sheets-Sheet 2
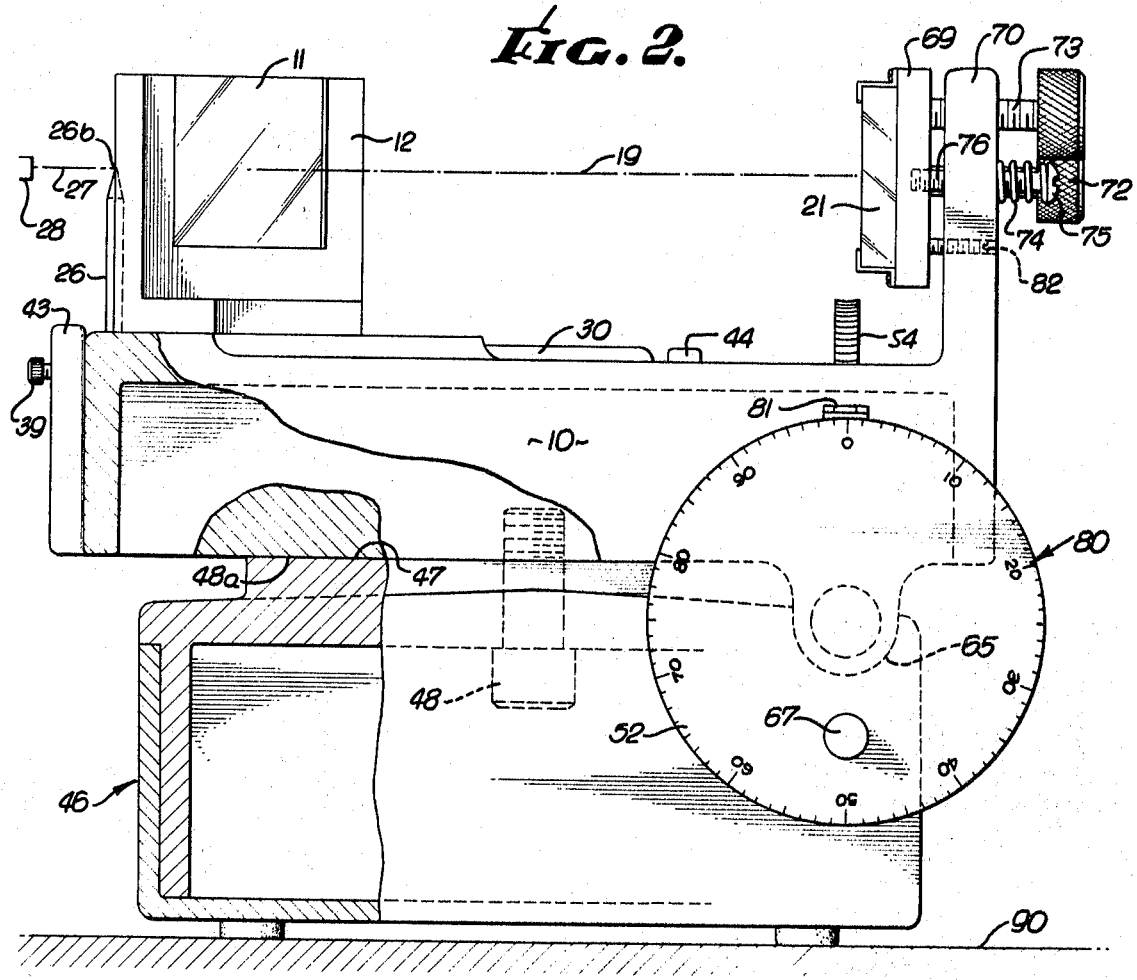
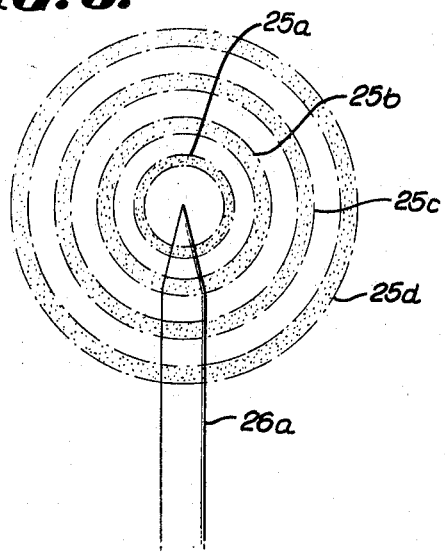
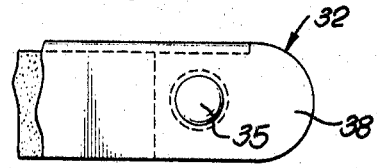
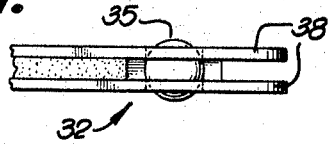
INVENTOR.
WILLIAM A. WARE
By White & Haefliger
ATTORNEYS.

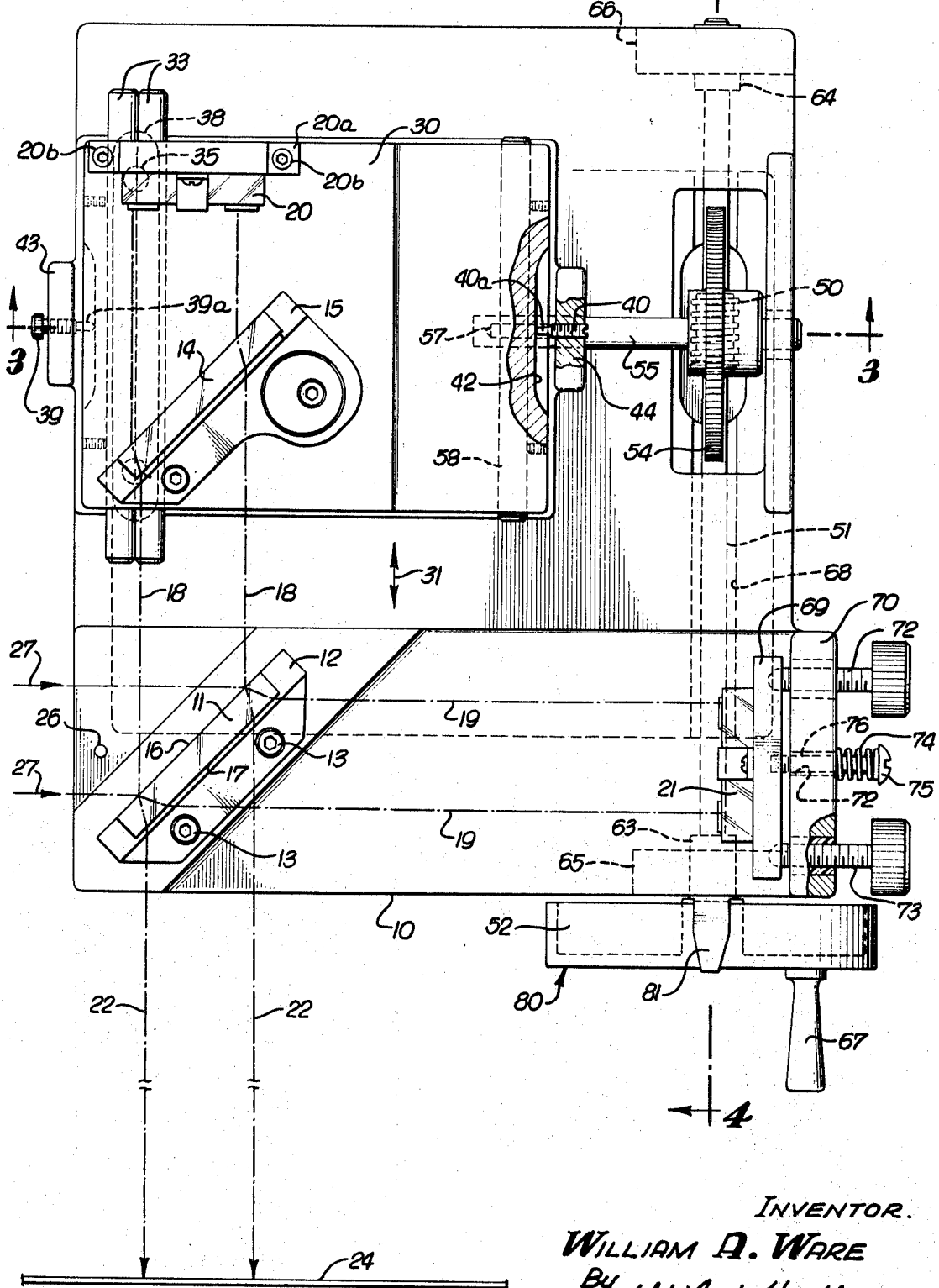

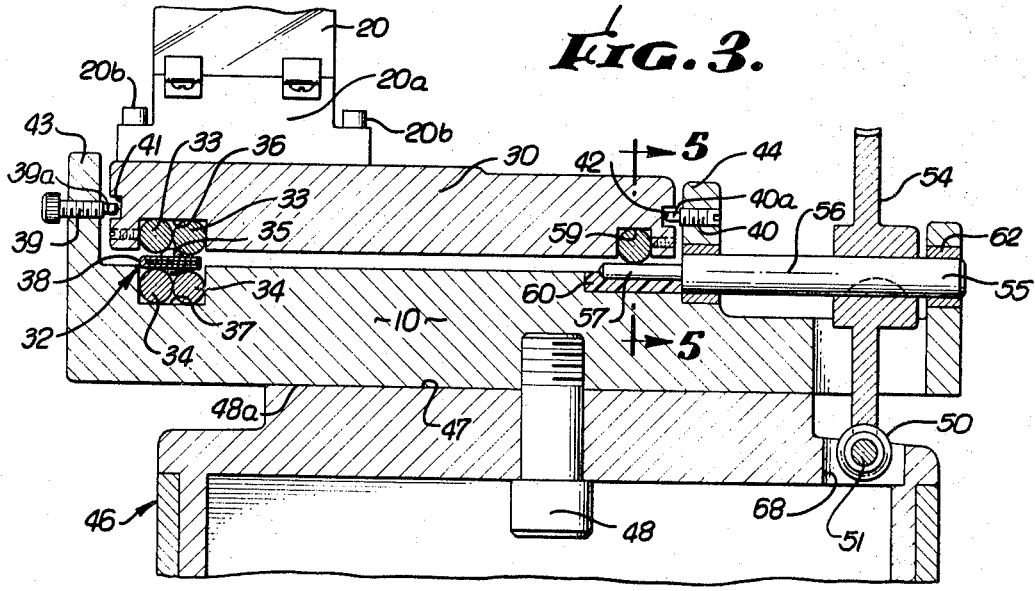
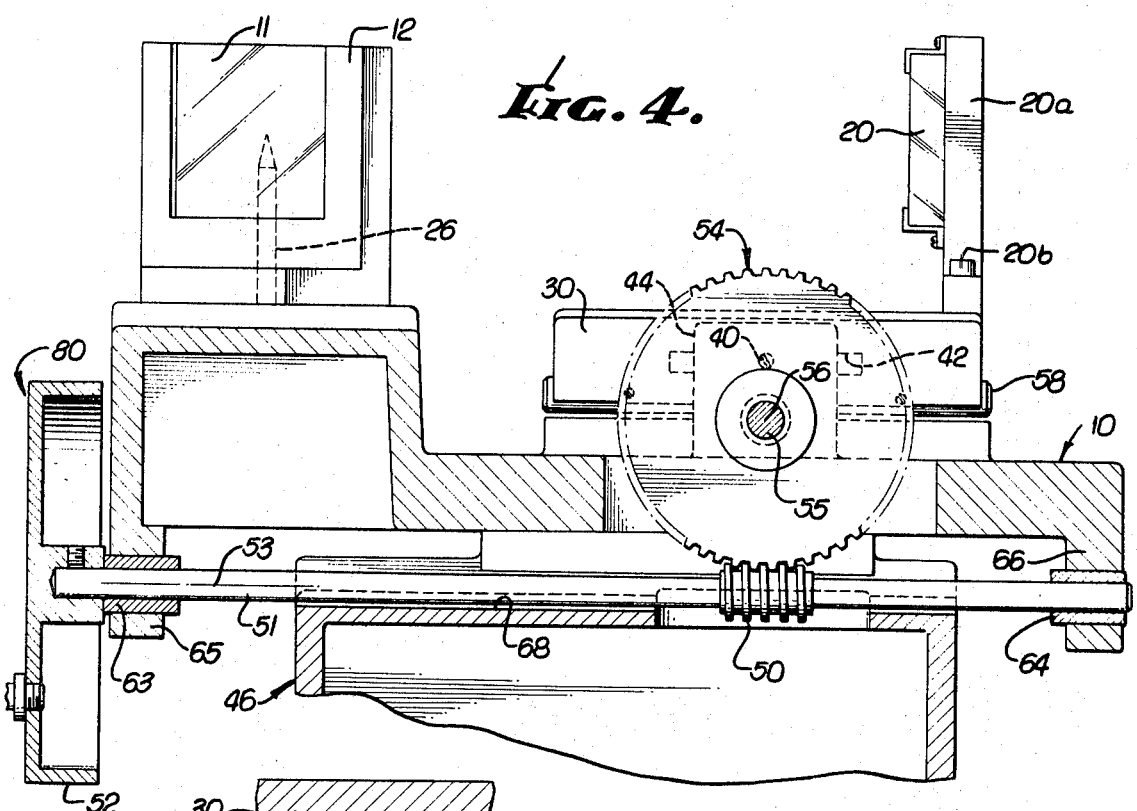

United States Patent Office 3,528,744
Patented Sept. 15, 1970

3,528,744
INSTRUCTION INTERFEROMETER
William A. Ware, South Pasadena, Calif., assignor, by mesne assignments, to Rusco Industries, Inc., Los Angeles, Calif., a corporation of Delaware
Filed May 10, 1967, Ser. No. 637,455
Int. Cl. G01b 9/02
U.S. Cl. 356—106      6 Claims

ABSTRACT OF THE DISCLOSURE

The disclosure concerns improvements in construction of interferometers adapted for instructional or educational use. These include advantageous integration of all components, enabling ready adjustment and ease of assembly and operation.

BACKGROUND OF THE INVENTION

This invention relates generally to interferometers, and more particularly concerns devices of this class which are usable for instruction purposes, as for example in schools.

The interferometer principle is well known, having been used in the well known experiment first performed by A. A. Michelson in 1881. The purpose of that experiment was to determine the speed of light, through use of a rotating mirror. Interferometers may also be used to measure distances in terms of wave length of light waves, through observation of fringe effects produced by interference of light transmitted by the interferometer. For example, very slight displacement of one of the mirrors of the instrument causes observable intrference fringe movement. In this manner, the distance traversed by the mirror can be determined to within a small fraction of the wave length of the light used.

There has existed need for an improved interferometer of such low cost yet precise construction as will particularly lend it to us for instruction or educational purposes. Such an interferomter is supplied by the present invention, and the unusual advantages in its construction, mode of operation, and use will become known to those skilled in the art from a study of the detailed description which follows. Among these are included unusually advantageous integration of all components, ready adjustment, and improvements in construction affording ease of assembly and use.

SUMMARY OF THE INVENTION

Basically, the Michelson interferometer with which the invention is concerned includes a plate operable to split incident source light into two beams, one beam reflected by the plate and the other beam transmitted by the plate, a first mirror to reflect the one beam back to the plate and a second mirror to reflect the second beam back to the plate. The improvements in basic construction afforded by the invention include a combination of elements as follows: a table mounting the plate and mirrors; means including a carriage movable on the table and carrying one of the mirrors for guiding movement of that mirror in a linear direction toward and away from the plate, thereby to vary light fringe effects produced by reflected beam transmission through the plate; a speed reducing drive to so move the carriage including a worm gear and a rotary handwheel for rotating the worm gear about a first axis, a spur gear having driven engagement with the worm gear and a shaft mounting the spur gear for rotation about a second axis generally perpendicular to the linear direction of carriage movement, and a part on the carriage having driven engagement with the shaft to move the carriage in the mentioned linear direction in response to shaft rotation, the shaft providing bearing support for the carriage via said part during carriage movement; and a large base immediately underlying and supporting the table at an elevation such that source light is incident on the plate, the handwheel being spaced laterally from the base.

Additional objects, features of construction and advantages include the provision of a base upper surface engaging the underside of the table throughout the major extent of the lateral dimension of that underside, for stability; a support upstanding from the table to support the other of the mirrors, and set screw means adjustable on the support to tilt the other of the mirrors, together with yieldable means on the support urging that other mirror toward the set screw; a shaft reduced diameter portion in engagement with the carriage part, which comprises a rod attached to the carriage for exposure to the shaft portion at the underside of the carriage; a fluorocarbon bearing supporting the shaft portion to resist downward deflection, and tongue and groove means on the table and carriage acting to resist upward displacement of the carriage relative to the table; and a source of laser light directed toward the plate together with a focusing pin carried by the table to project vertically in the path of light from the source directed toward the plate.

These and other objects and advantages of the invention, as well as the details of illustrative embodiments, will be more fully understood from the following detailed description of the drawings, in which:

BRIEF DESCRIPTION OF THE DRAWING

FIG. 1 is an overall plan view of the instrument, partly broken away to show interior construction;

FIG. 2 is a first elevation of the instrument, partly broken away to show interior construction;

FIG. 3 is a vertical section taken on line 3—3 of FIG. 1;

FIG. 4 is a vertical section taken on line 4—4 of FIG. 1;

FIG. 5 is an enlarged fragmentary section taken on line 5—5 of FIG. 3;

FIGS. 6 and 7 are plan and elevation views illustrating a bearing; and

FIG. 8 illustrates observable interference fringes in relation to the projected image of a pin carried by the instrument.

DESCRIPTION OF THE PREFERRED EMBODIMENT

In the drawings a horizontal table 10 mounts a rectangular glass plate 11 as by means of a frame 12 retaining the plate in upright position, the frame being attached to the table by fasteners 13. In similar manner, a second rectangular plate 14 is mounted by a frame 15 carried by the table. Plate 11 has parallel opposite vertical surfaces 16 and 17 and is operable to split incident source light into two beams, one of which at 18 is reflected by the "half-silvered" surface 16 of the plate and the other of which is transmitted at 19 by the plate. The table also mounts a first mirror 20 to reflect the beam 18 back to the plate, and a second mirror 21 to reflect beam 19 back to the plate. It will be seen that the beam 19 reflected by mirror 21 re-enters the plate 11 and is reflected at surface 16 to pass back through the plate and exit at 22, that beam having thus passed three times through the plate. Similarly, beam 18 may be caused to pass three times through glass of the thickness of plate 11, since it passes twice through plate 14 and once through plate 11 to emerge at 22 (plate 14 being of the same size and thickness as plate 11); however, plate 14 need not be used if purely demonstration usage of the intrferometer is contemplated.

Detection of beam interferences produced fringes may be achieved by observation of the projection screen or surface 24, and in this regard FIG. 8 shows representative fringes in the form of concentric shadow annuli 25a–25d, such as may be seen on the screen. That figure also shows the shadow 26a of the focusing pin 26 carried by the table to project vertically in the path 27 of light directed from a source 28 toward the plate 11. The source may for example comprise a laser, for producing highly fissionable fringes.

Means including a carriage 30 carrying the mirror 20 is movable on the table for guiding movement of that mirror in a linear direction (indicated at 31) toward and away from the plate 11, thereby to vary interference fringe effects produced by reflected beam transmission through the plate 11. Such movable support means includes the linear bearing indicated generally at 32, and located between two adjacent and parallel upper rods 33 and two adjacent parallel lower rods 34. The lower rods define a horizontal way comprising the bearing to travel linearly only in the direction 31, and likewise the bearing balls 35 received partly between the upper rods 33 constrain the latter to travel only in longitudinal direction 31. In this regard, rods 33 are attached to the carriage via their reception in recess 36, and rods 34 are attached to the table via their reception in recess 37. Bearing balls are confined by a horizontally extending retainer 38, also seen in FIGS. 6 and 7. Finally, the terminals 39a and 40a of horizontal set screws 39 and 40 are received in longitudinal grooves 41 and 42 in opposite sides of the carriage to block lifting of the carriage off the table, which could inadvertently disassemble the bearing 32 from its ways. The screws may be tightened against the carriage sides in any longitudinal position of the carriage to arrest movement of the fringe shadows observed at surface 24, the screws being carried by flanges 43 and 44 integral with the table. Mirror 20 is carried by a frame 20a attached at 20b to the carriage.

It will be seen that a large base 46 immediately underlies and supports the table to extend horizontally, and at an elevation such that light directed along path 27 is incident upon the plate 11, the center of the beam striking the tip 26b of the focusing pin. The base 46 has an extensive upper surface 47 engaging the underside 48a of the table throughout the major extent of a lateral dimension of that underside, as seen in FIG. 2. Also, the base and table are attached as by the fastener 48, and in a position to facilitate the carriage drive to be described. The base rests upon a surface 90.

The speed reducing drive to move the carriage in the direction 31 includes a worm gear 50 on a shaft 51 extending in the direction 31, a rotary handwheel 52 on the shaft for rotating the worm gear about a first horizontal axis 53 defined by the shaft; a spur gear 54 having driven engagement with the worm gear and a shaft 55 mounting the spur gear for rotation about a second horizontal axis 56 generally perpendicular to the direction 31 of carriage movement. Shaft 55 has a reduced diameter portion 57 projecting beneath the carriage, and the latter carries a part having driven frictional engagement with shaft portion 57 to move the carriage in direction 31 in response to shaft rotation. Typically, the part may comprise a circular rod 58 extending in the direction 31 and seating on shaft portion 57 so that the latter also provides bearing support for the carriage via the part 58. The rod part 58 is retained in a recess 59 sunk in the underside of the carriage.

A fluorocarbon (for example Teflon) bearing 60 carried on the table supports the shaft portion 57 to resist downward deflection thereof as carriage weight is transmitted to portion 57. Note also that shaft 55 is also bearing supported at 62; and that shaft 51 is supported at bearings 63 and 64 carried by flanges 65 and 66 depending from the table in offset relation to the base. Thus, the handwheel is spaced laterally from the large base, and is provided with a handle 67. Also shaft 51 is received within a groove 68 in the base for compactness.

It will be seen that mirror 21 is carried by a backer 69 which is in turn carried by a support 70 upstanding from the table. Three equally spaced and laterally directed horizontal set screws 72, 82 and 73 are thread connected to and adjustable relative to the supprt 70, to controllably tilt the mirror 21 as by terminal engagement with the backer 69. The backer and mirror are urged toward the set screw terminals by yieldable means such as the coil spring 74 positioned between the support 70 and the head 75 of a fastener having a shank 76 attached to the backer 69. Shank 76 projects horizontally through an opening 77 in the support. Thus, the set screw terminals always engage the backer so as to prevent controllable tilting of the mirror 21, for fringe focusing at surface 24.

In operation, a controlled rotary displacement of the handwheel, as determined by passage of indicia 80 past marker 81 imparts a controlled linear displacement of the mirror 20. This may be in turn related to the wavelength of light through radial displacement of the fringes 25a–25d toward or away from the centered apex of the focusing pin, as seen in FIG. 8. The drive affords a speed reduction of greater than 200/1, so that a handwheel may be slowly rotated to cause the fringes 20a–20d to move radially, the innermost circular fringe moving toward the center and disappearing. The degree of handwheel movement between the successive disappearances of two such fringes can then be mathematically related to the wavelength of the light from the source.

I claim:

1. In a Michelson interferometer that includes a plate operable to split incident source light into two beams, one beam reflected by the plate and the other transmitted by the plate, a first mirror to reflect said one beam back to the plate and a second mirror to reflect said other beam back to the plate, the improvement comprising, a table mounting the plate and mirrors, means including a carriage movable on the table and carrying one of the mirrors for guiding movement of said one mirror in a linear direction toward and away from the plate thereby to vary interference fringe effects produced by reflected beam transmission through the plate, a speed reducing drive to so move said carriage including a worm gear and a rotary handwheel for rotating the worm gear about a first axis, a spur gear having driven engagement with the worm gear and a shaft mounting the spur gear for rotation about a second axis generally perpendicular to said linear direction of carriage movement, and a part on the carriage having driven engagement with said shaft to move the carriage in said linear direction in response to shaft rotation, the shaft providing bearing support for the carriage via said part during said carriage movement, there also being linear bearing means and upper and lower ways therefor carried by the carriage and table, said part and said upper and lower ways extending in said linear direction of carriage movement and being spaced so that said shaft and said lower ways receive the loading imposed by the carriage with said upper and lower ways cooperating with said linear bearing means to block skewing of the carriage, the carriage having opposite edge portions which are transversely spaced in the direction of the second axis, the said linear bearing means being proximate one edge portion of the carriage and the shaft supporting the carriage proximate the opposite edge portion thereof, a large base immediately underlying and supporting the table at an elevation such that source light is incident on the plate, the handwheel spaced laterally from the base, and adjustable means carried by one of the table and carriage and engageable with the other of the carriage and table for restraining such lifting of the carriage off the table as would dis-assemble the bearing means and ways, said means also having a position of engagement with said other of the table and carriage throughout an extended range of carriage movement to arrest said movement independently of operation of said drive.

2. The combination of claim 1 in which the base has an upper surface engaging the underside of the table throughout the major extent of a lateral dimension of said underside, and means attaching the table to the base.

3. The combination of claim 1, including a support upstanding from the table and supporting the other of said mirrors, set screw means adjustable on the support to tilt the other of said mirrors, and yieldable means on the support urging said other mirror in a direction toward the set screw means.

4. The combination of claim 1, in which said shaft has a reduced diameter portion in engagement with said carriage part, said part comprising a rod attached to the carriage for exposure to said shaft portion at the underside of the carriage.

5. The combination of claim 4, including a fluorocarbon bearing supporting said shaft portion to resist downward deflection thereof, and tongue and groove means on the table and carriage acting to resist upward displacement of the carriage relative to the table.

6. The combination of claim 1, including a source for laser light directed toward said plate, and a focusing pin carried by the table to project vertically in the path of light from said source directed toward said plate.

References Cited

UNITED STATES PATENTS

| 2,922,351 | 1/1960 | Hering | 95—45 |
| 2,512,700 | 6/1950 | Van Auken | 74—198 |

OTHER REFERENCES

Fundamental of Optics, Jenkins & White, McGraw-Hill, 1957, pp. 244–246.

ROY LAKE, Primary Examiner

C. CLARK, Assistant Examiner